United States Patent Office 3,477,928
Patented Nov. 11, 1969

3,477,928
PROCESS FOR THE RECOVERY OF METALS
Enzo L. Coltrinari, Arvada, Colo., assignor to Cerro Corporation, New York, N.Y., a corporation of New York
No Drawing. Filed Mar. 28, 1966, Ser. No. 537,722
Int. Cl. C22d 1/26
U.S. Cl. 204—123    7 Claims

ABSTRACT OF THE DISCLOSURE

An improved, continuous process for the recovery of lead, silver, copper and bismuth metal values from low-grade, oxidized lead ores containing said metal values, which comprises comminuting at least about 50 to 70 percent of the ore material to minus 325 mesh size, mixing the comminuted ore with an effective amount of a chloridizing agent sufficient to convert the metal values into brine-soluble form, roasting the resulting admixture in a two-stage, nonvolatilizing roast operation, the first stage being conducted at a temperature between about 510° C. to about 660° C. under a neutral atmosphere to remove a substantial portion of any sulfur originally present in the ore, the second stage being conducted at a temperature between about 500° C. and about 540° C. under an oxidizing atmosphere to convert the metal values into brine-soluble form, leaching the resulting calcine in a brine solution with a pH between about 1.9 and about 2.5 to extract the metal values therefrom and subsequently recovering the metals by electrodeposition techniques.

---

This invention relates to a process for the recovery of metals. More specifically, the invention relates to a process for the recovery of silver, lead, copper and bismuth from low grade oxidized lead ores containing said metals.

It is an object of this invention to provide an efficient process for the recovery of silver, from low-grade silver-lead ores in which the silver is present in comparatively minor quantities.

It is another object of the invention to provide a process characterized by improved recovery of silver and lead from low-grade silver-lead ores which process can be conducted in a batch-wise or continuous operation.

It is still another object of the invention to provide an economic process for recovering improved yields of silver from ores containing such small amounts that other well known processes have been heretofore considered impractical.

These and other related objects are achieved by a process which comprises a combination of steps or operations which provide conditions and accomplish results essential to the success of the overall process.

Broadly, the instant process comprises mixing a comminuted ore material with an effective amount of a chloridizing agent; roasting the resulting admixture under, first, non-oxidizing conditions, and then, under oxidizing conditions; leaching the resulting calcine in a brine solution to extract the metal values from the calcine; and then recovering the metals by electrodeposition techniques.

Oxidized silver-lead ores to which the invention is particularly adapted include low-grade ores consisting of siliceous, ferruginous gossan containing at least about 1 weight percent lead, from about 6 to about 30 weight percent iron, from about 0.5 to about 5 weight percent sulfur, and about 3 to about 20 ounces of silver per ton of ore. The analysis of illustrative ores are set forth below:

The raw ore is first ground to a suitable particle size such that it can be intimately and uniformly mixed with the chloridizing agent. Generally, the ore should be ground to such a size that from about 50 to about 100% of the ground ore will pass through a −325 mesh screen. Preferably, at least about 70% of the ore should pass through a −325 mesh screen. Experiments have indicated that the extraction of lead is not critically dependent upon the fineness of the ore particles. The extraction of silver, however, is significantly affected by the particle

TABLE 1

| Ore | Oz./ton | Percent | | | | | | | | |
|---|---|---|---|---|---|---|---|---|---|---|
| | | Cu | Pb | Zn | Bi | SiO$^2$ | Fe | S | SO$_4$/S | H$_2$O |
| A | 7.57 | 0.23 | 1.08 | 0.3 | 0.11 | 61.5 | 14.2 | 3.86 | 0.51 | 5.64 |
| B | 10.50 | 0.10 | 1.10 | 0.5 | 0.03 | 72.5 | 9.5 | 1.82 | 0.73 | 5.91 |
| C | 8.35 | 0.09 | 4.00 | 0.5 | 0.03 | 60.6 | 15.5 | 1.76 | 0.53 | 6.06 |
| D | 6.30 | 0.13 | 2.10 | 0.5 | 0.06 | 67.5 | 11.8 | 1.37 | 0.50 | 3.44 |
| E | 8.80 | 0.38 | 3.90 | 2.0 | 0.10 | 33.0 | 26.9 | 0.70 | 0.16 | 16.75 | size of the ore. The influence of particle size on the recovery of silver and lead is shown in Table 2 below:

TABLE 2

| Percent of ore, −325 mesh | Total extraction (percent) | |
|---|---|---|
| | Silver | Lead |
| 45 | 87 | 88.5 |
| 57 | 90 | 89 |
| 73 | 94 | 88 |
| 88 | 95 | 88 |

After grinding, the ore is intimately and homogeneously mixed with an effective amount of a chloridizing agent, preferably sodium chloride, to provide a homogeneous admixture suitable for roasting. The term "effective amount" is intended to refer to an amount of chloridizing agent which is sufficient to convert the metal values in the ore to a brine-soluble form. Generally, from about 3 to about 7 and preferably from about 3.5 to 5 weight percent of sodium chloride is employed as the chloridizing agent. Variation in the amount of sodium chloride has been found to have a more significant effect on the recovery of silver than upon the recovery of lead. The sodium chloride can be added to the ore in dry form either before or after grinding, or it can be added to the ore in the form of a concentrated aqueous solution. It is believed that the sodium chloride has an important effect on the solubilization of copper, zinc and bismuth. Generally, the sodium chloride should be ground to a particle size of at least about —65 mesh since the particle size of the chloridizing agent has been found to have a substantial effect on the recovery of silver.

The effect of varying concentrations of sodium chloride on recovery of silver and lead is shown in Table 3, below. In these investigations, the ore was mixed with the indicated amount of —65 mesh sodium chloride and then roasted in air at 510° C. for a period of about sixty minutes. The calcined ore was then leached with acidified brine containing 270 grams per liter of sodium chloride. Analysis of residue and of the leach liquor gave the results tabulated in Table 3.

TABLE 3

| NaCl (percent) | Extraction (percent) | |
| --- | --- | --- |
|  | Pb | Ag |
| 0 | 79.9 | 52.6 |
| 1 | 82.6 | 68.6 |
| 3 | 83.5 | 91.8 |
| 5 | 83.1 | 94.3 |

In addition to serving as the chloridizing agent, the sodium chloride also influences the removal of sulfur from the ground ore during the first stage, i.e., the non-oxidizing stage, of the roasting operation. Investigation has shown that the ratio of sulfate to lead in the brine leach liquor can be controlled, at least in part, through the amount of sodium chloride employed, and is significantly decreased by increasing the amount of sodium chloride from about 2 to about 7% by weight based on the weight of the ore.

The mixture of ore and sodium chloride is roasted at a temperature which is sufficient to convert the metal values to a brine soluble form without undue loss of metal values through volatilization. Roasting of the ore and sodium chloride is conducted in a two-stage operation. The first stage, intended primarily for the removal of a substantial portion of the sulfur originally contained in the ore, is preferably conducted under a neutral atmosphere, e.g., in an atmosphere comprising nitrogen, carbon dioxide and water vapor preferably in a volume ratio of about 8:1:1. The term "neutral" used herein refers to an atmosphere which favors the conversion of sulfur to a form which can be removed by volatilization, i.e., an atmosphere which will neither oxidize sulfur to sulfate nor reduce volatile sulfur compounds to a non-volatilizable form. Removal of sulfur is important since the presence of oxidizable sulfur in the ore during the second stage roast results in an increase in the concentration of sulfates ultimately appearing in the brine liquor after leaching.

In the two-stage roasting operation, the sulfur removal stage is carried out at a temperature which is sufficient to remove substantially all of the sulfur originally present in the ore, but without volatilization of any of the metal values. The amount of sulfur removed is dependent upon the temperature of the first stage roast as well as upon the atmosphere and the amount of chloridizing agent present during the roast. The temperature during the first stage roast is preferably maintained between about 510 and 660° C. and more preferably at about 560° C. If the temperature of this first stage roast is increased more of the sulfur can be removed and the extraction of lead can be markedly increased. However, high temperatures have been found to be detrimental to the recovery of silver. Accordingly, a practical balance between silver recovery and sulfur removal must be accepted. Any sulfur which remains in the ore will be converted to sulfate during the second stage roast and will be extracted into the brine during the leaching step. This sulfate can be controlled by adequate treatment of the brine as described herein.

The second stage roast, which is conducted under oxidizing conditions, is directed to the conversion of the lead, silver, copper and bismuth to a form which can be easily and efficiently leached from the roasted ore by a brine solution. A suitable oxidizing atmosphere can be provided by the use of air, alone or in admixture with the normally present combustion gases. It has also been found beneficial to employ small amounts of chlorine gas, e.g., up to about 5 percent by volume of the atmosphere, during the second stage of the roasting operation. Chlorine gas has been found to be particularly beneficial in connection with the lead extraction.

The second stage chloridizing roast under an oxidizing atmosphere is conducted at temperatures which are sufficient to convert the metal values to a brine leachable form without volatilization. Generally, this chloridizing roast is conducted at temperatures from about 500° C. to about 540° C. and preferably about 510° C. The time required to remove the sulfur and to convert the metal values to a brine soluble form can be easily determined by analysis of the gas removed during the first stage roast and analysis of the brine leach liquor for silver and lead. It has been found that about a 30-minute first-stage roast is sufficient for complete removal of the sulfur and about a 30-minute second-stage roast is sufficient for recovery of about 92% of the silver. Maximum lead recovery can be obtained after an oxidizing roast of about 15 minutes.

After roasting the resulting calcine is mixed with a concentrated acidified brine solution to form a slurry in order to extract the chloridized metals from the calcined ore. The amount of brine used per ton of raw ore depends at least in part upon the lead content of the original ore. Generally, the solids content of the ore slurry should be from about 25 to about 40 percent and preferably about 33 percent. The amount of brine actually employed should be an amount sufficient to provide a leach liquor having a lead content of from about 15 to about 20 grams per liter. Accordingly with high content lead ores a slurry of lower solids content should be employed; conversely if a low grade ore is used, the proper lead concentration can be provided by using less brine per tone of ore thereby providing a slurry of relatively high solids.

Solubility of the metal values in the brine is effected by the salt concentration in the brine as well as the temperature and acidity thereof. Moreover, because lead sulfate has a low solubility, the concentration of sulfate ion in the brine must be limited, as mentioned above, to prevent loss of lead by precipitation during leaching.

The solubility of lead and silver increases significantly with increase in the sodium chloride concentration of the brine leach liquor until the saturation point of sodium chloride is reached. At this point, the solubility drops abruptly. Accordingly, a concentrated but non-saturated, brine having a sodium chloride content of between about 200 and 300 grams per liter of sodium chloride and preferably, from about 272 to about 297 grams per liter of sodium chloride is generally employed. Since additional chloride from the roasted ore is introduced into the brine, it may be necessary in recycle operations to dilute the brine in order to maintain these optimum levels of sodium chloride.

Hydrochloric acid is added to the brine leach liquor during the leaching operation. This acid is required partly to neutralize the lime which is added for the purpose of sulfate control and partly to improve extraction of the metal values from the ore. It has been found experimentally that increasing the acidity of the leach liquor increases the extraction of silver and lead.

With respect to silver and lead, it has been observed that variations in the quantity of sodium chloride added to the roast is related to the acidity necessary for efficient leaching. For example, if 40 pounds of hydrogen chloride are used for leaching a calcined ore, increasing the amount of sodium chloride addition from 3.5% to about 7% by weight does not influence the extraction of lead. However, if smaller amounts of hydrogen chloride, e.g., about 10 pounds, is used to acidify the brine, the amount of sodium chloride employed has a considerable influence on subsequent extraction of lead. In the case of silver, reduction of the amount of sodium chloride used during roasting of the ore, results in a decrease in the silver extraction, even if 40 pounds of hydrogen chloride per ton of ore are added to the brine for leaching. In general, the brine leach liquor should be acidified with between 15 and 40 pounds of hydrogen chloride per ton of ore in addition to the amount of hydrogen chloride which is required to provide calcium chloride for sulfate control. The pH of the brine solution should be between about 1.9 and 2.5 and preferably should be approximately 2.2. A pH of about 2.2 can be provided by adding about 20 pounds of hydrogen chloride per ton of ore to the brine liquor in addition to the amount required for maintaining the sulfate at an operable concentration level. The influence of variations in acidity and in the amount of salt employed during the roast, is shown in Table 4 below.

TABLE 4

| HCl/ton of ore (Percent) | Extraction | | | |
|---|---|---|---|---|
| | Ag (Percent) | | Pb (Percent) | |
| | 5% NaCl Roast | 3.5% NaCl Roast | 5% NaCl Roast | 3.5% NaCl Roast |
| 10 | 90 | 87.5 | 84 | 81 |
| 20 | 92 | 90 | 86 | 84 |
| 40 | 93 | 91 | 89.5 | 88 |

Table 5 below shows the influence of temperature upon the extraction of silver and lead.

TABLE 5

| | 1 | 2 | 3 |
|---|---|---|---|
| HCl Added, Lbs. 100% HC./ton calcine | 40 | 40 | 10 |
| Leach temperature, °C | 68 | 130–150 | 130 |
| Leach time, Mins | 60 | 40 | 45 |
| Extraction: | | | |
| Percent Ag | 92.7 | 92.9 | 92.0 |
| Percent Pb | 90.1 | 90.8 | 85.8 |

As mentioned above the level of sulfate ion concentration in the brine must be controlled. If the concentration of sulfate in the brine reaches high enough levels lead will precipitate in the form of lead sulfate thereby reducing the recovery of lead. Increasing concentrations of sulfate ions is a particularly serious problem when a continuous process comprising recirculation of the brine is employed. It will be appreciated that the presence of excessive amounts of sulfate in the brine will increase the cost of controlling the level of sulfate in the recirculating brine. Generally, the sulfate concentration is controlled by precipitation of the excess sulfate as calcium sulfate through the addition of calcium chloride to the brine. The calcium chloride can be added directly to the brine or it can be provided, in situ, by adding hydrochloric acid and lime to the brine. Alternatively, the sulfate concentration can be controlled by refrigeration of the brine, thereby precipitating the sulfate as hydrated sodium sulfate. Obviously, the removal of any sulfur prior to the oxidizing roast would result in a reduction of the overall cost of operation.

After leaching, the brine leach liquor is separated from the ore by filtration or some other suitable method. In order to properly separate all the dissolved metal values from the leached ore the ore should be washed, e.g., by repulping and refiltering, in order to dilute all of the dissolved metal values and transfer them to a suitable aqueous solution for subsequent recovery of the metal values by electrolysis.

The metal values, including the silver, copper, and bismuth, are recovered from the leach liquor, in the form of a lead bullion by electro-deposition techniques. The lead bullion thus provided can be further processed for the recovery of the individual metals by various metallurgical techniques well known in the art, e.g., fire or electrolytic refining. Generally, the lead bullion is deposited on a suitable cathode, e.g., a cathode of lead or unpolished iron, in the form of relatively dense adherent sponge by electrolyzing the leach liquor under suitable conditions of temperature and current density, preferably at a temperature at least about 70° C., a current density between about 12.0 and 19.5 amperes per square foot, and a voltage between about 2.0 and 2.4 volts.

Employment of temperatures of at least about 70° C. provides a suitable lead deposit which is easy to handle and which adheres to the cathode without falling or flaking off. Moreover, such temperatures provide for more efficient power consumption and depletion of the lead content of the brine to a low level, i.e. about 0.2 gram per liter.

During electrolysis, the brine solution should be agitated with sufficient vigor to circulate the brine without causing the deposited lead to fall from the cathode. Agitation was found to significantly effect the characteristics of the lead bullion deposited on the cathode. If agitation was too gentle, the cell resistance was found to increase, resulting in a higher voltage and increased gas formation. The increased amount of gas formation was found to cause a more spongy and less adherent deposit.

During the electrolytic precipitation of lead, silver, copper and bismuth from the brine leach liquor as described above, a brown precipitate forms in the electrolytic cell. This material is comprised mainly of manganese dioxide as well as small amounts of compounds of other metals such as aluminum, iron, chromium, silicon, magnesium, calcium, sodium and the like. This material may be separated by filtration of the leach liquor. Similarly, zinc may be recovered by the precipitation of zinc hydrate from the brine after electro-deposition by treating brine with sodium hydroxide or lime, and separating the precipitate by filtration, or other equivalent means.

The process described herein, can be carried out in a batch-wise or a continuous process in which the depleted leach liquor after electrolysis may be recycled after suitable treatment to remove precipitated manganese dioxide and for sulfate control and used for the subsequent leaching of additional batches of calcined ore.

I claim:

1. A process for recovering lead, silver, copper and bismuth metal values from a low-grade, oxidized lead ore containing said metal values which comprises the following steps:
   (1) Comminuting the original ore to such a particle size that from at least about 50 to about 70 percent by weight of said ore will pass through a minus 325 mesh screen;
   (2) mixing said comminuted ore with an effective amount of sodium chloride, ground to a particle size of at least about minus 65 mesh, sufficient to convert the said metal values into brine-soluble form;
   (3) roasting the resulting admixture in a two-stage, nonvolatilizing roast operation, the first stage being conducted at a temperature ranging from about 510°

C. to about 660° C. under a neutral atmosphere to remove a substantial portion of any sulfur originally present in said ore, and the second stage being conducted at a temperature ranging from about 500° C. to about 540° C. under an oxidizing atmosphere to convert said metal values to brine-soluble form;

(4) leaching the resulting calcine in a brine solution with a pH between about 1.9 to about 2.5 to facilitate extraction of said metal values from said calcine; and (5) subsequently recovering said metal values by electrodeposition techniques.

2. The process according to claim 1 wherein the neutral roast stage of the roasting operation is conducted at about 560° C. in an atmosphere comprising nitrogen, carbon dioxide and water vapor in a volume ratio of about 8:1:1 and wherein the oxidizing stage of said roasting operation is conducted at about 510° C. in the presence of air.

3. The process according to claim 2 wherein the atmosphere under which the second stage of the roast is conducted comprises air and up to about 5 percent by volume of chlorine gas.

4. The process according to claim 1 wherein the calcined ore is leached with a concentrated, but unsaturated brine solution containing from 200 to 300 grams per liter of sodium chloride to form a slurry containing from about 25 to about 40 percent solids.

5. The process according to claim 4 wherein electrodeposition of said lead bullion is carried out at a temperature of at least 70° C., a current density of about 12.0 to about 19.5 amperes per square foot and a voltage of about 2.0 to about 2.4 volts.

6. The process according to claim 1 wherein an effective amount of sodium chloride is from about 3 to about 7 percent by weight of the comminuted ore.

7. The process according to claim 1 wherein said metal values are deposited as lead bullion in a relatively dense, adherent sponge like form on a cathode consisting essentially of a metal selected from the group consisting of lead and unpolished iron, said brine solution being agitated during electrolysis with sufficient vigor to circulate the brine without causing the deposited lead bullion to fall from said cathode.

References Cited
UNITED STATES PATENTS

| | | | |
|---|---|---|---|
| 866,580 | 9/1907 | Davis | 75—7 |
| 932,689 | 8/1909 | Eldred | 75—7 |
| 1,284,910 | 11/1918 | Larson | 204—117 |
| 1,368,885 | 2/1921 | Bradford | 75—113 |
| 1,980,809 | 11/1934 | Levy | 204—117 XR |

JOHN H. MACK, Primary Examiner

G. L. KAPLAN, Assistant Examiner

U.S. Cl. X.R.

75—7; 204—105, 106, 107, 109, 111, 114, 117